United States Patent
Bivans

(10) Patent No.: US 12,495,059 B2
(45) Date of Patent: Dec. 9, 2025

(54) METHOD FOR SCALABLE INTEGRITY ENCAPSULATION

(71) Applicant: Fort Robotics, Inc., Philadelphia, PA (US)

(72) Inventor: Nathan Bivans, Philadelphia, PA (US)

(73) Assignee: Fort Robotics, Inc., Philadelphia, PA (US)

(*) Notice: Subject to any disclaimer, the term of this patent is extended or adjusted under 35 U.S.C. 154(b) by 354 days.

(21) Appl. No.: 18/081,833

(22) Filed: Dec. 15, 2022

(65) Prior Publication Data

US 2023/0188557 A1   Jun. 15, 2023

Related U.S. Application Data

(60) Provisional application No. 63/289,902, filed on Dec. 15, 2021.

(51) Int. Cl.
*H04L 9/40* (2022.01)

(52) U.S. Cl.
CPC .................. *H04L 63/1433* (2013.01)

(58) Field of Classification Search
CPC ............ H04L 63/1433; H04L 63/105
See application file for complete search history.

(56) References Cited

U.S. PATENT DOCUMENTS

| | | | |
|---|---|---|---|
| 6,105,150 A | 8/2000 | Noguchi et al. | |
| 6,792,562 B1 | 9/2004 | Korhonen | |
| 8,527,760 B2 * | 9/2013 | Faiman | H04L 63/105 713/168 |
| 8,726,344 B1 * | 5/2014 | Amidon | H04L 63/107 713/168 |
| 8,874,818 B2 | 10/2014 | Felth et al. | |
| 10,038,700 B1 * | 7/2018 | Duchin | H04L 67/12 |
| 10,454,689 B1 * | 10/2019 | Sharifi Mehr | H04L 63/166 |
| 11,127,295 B2 | 9/2021 | Radha et al. | |
| 11,372,796 B2 | 6/2022 | Culca et al. | |

(Continued)

FOREIGN PATENT DOCUMENTS

| WO | 2007115272 A1 | 10/2007 |
|---|---|---|
| WO | 2012122994 A1 | 9/2012 |

(Continued)

OTHER PUBLICATIONS

International Search Report received in PCT/US22/52932 dated Apr. 12, 2023.

(Continued)

*Primary Examiner* — Hieu T Hoang

(74) *Attorney, Agent, or Firm* — Run8 Patent Group, LLC; Peter Miller; Brian T. Chew

(57) ABSTRACT

A method includes, at a first communication module: receiving a first message from a second communication module, the first message including a set of data in a first data stream from a first device; accessing a first configuration profile, in a set of configuration profiles, for the first data stream based on the first data stream identifier; generating a set of metrics for the first message; calculating a set of trust scores for the first message based on the set of metrics and the first configuration profile; generating a second message including the set of data and the set of trust scores; and transmitting the second message to a second device.

5 Claims, 4 Drawing Sheets

(56) References Cited

U.S. PATENT DOCUMENTS

| | | | |
|---|---|---|---|
| 11,455,223 B2 | 9/2022 | Nagy et al. | |
| 2003/0195891 A1* | 10/2003 | Marsh | H04N 7/165 |
| | | | 348/E7.063 |
| 2004/0008467 A1 | 1/2004 | Calandre et al. | |
| 2004/0078116 A1 | 4/2004 | Hashimoto et al. | |
| 2004/0153786 A1 | 8/2004 | Johnson et al. | |
| 2005/0091501 A1 | 4/2005 | Osthoff et al. | |
| 2006/0247872 A1 | 11/2006 | Boutin | |
| 2007/0230627 A1 | 10/2007 | Veen et al. | |
| 2008/0059867 A1 | 3/2008 | Lin et al. | |
| 2009/0024629 A1* | 1/2009 | Miyauchi | G06F 21/6218 |
| | | | 707/999.009 |
| 2009/0037776 A1 | 2/2009 | McAfee et al. | |
| 2009/0043939 A1 | 2/2009 | Fuessl et al. | |
| 2009/0055561 A1 | 2/2009 | Ritz et al. | |
| 2009/0164263 A1* | 6/2009 | Marlow | G06Q 30/02 |
| | | | 705/1.1 |
| 2009/0222399 A1* | 9/2009 | Gomez | G05B 23/0221 |
| | | | 709/224 |
| 2009/0292951 A1 | 11/2009 | Fournier et al. | |
| 2011/0213984 A1 | 9/2011 | Orlando et al. | |
| 2011/0283356 A1* | 11/2011 | Fly | G06F 21/577 |
| | | | 726/22 |
| 2012/0072384 A1* | 3/2012 | Schreiner | G06Q 30/02 |
| | | | 706/45 |
| 2013/0094509 A1 | 4/2013 | Chen et al. | |
| 2013/0145214 A1 | 6/2013 | Provencher et al. | |
| 2014/0207953 A1* | 7/2014 | Beck | H04L 67/63 |
| | | | 709/225 |
| 2014/0223057 A1 | 8/2014 | Fredriksson | |
| 2014/0350725 A1 | 11/2014 | LaFary et al. | |
| 2014/0372758 A1 | 12/2014 | Agiwal et al. | |
| 2015/0242605 A1* | 8/2015 | Du | G06F 21/32 |
| | | | 726/7 |
| 2016/0073271 A1* | 3/2016 | Schultz | H04W 64/003 |
| | | | 455/410 |
| 2017/0024500 A1 | 1/2017 | Sebastian et al. | |
| 2018/0077146 A1* | 3/2018 | Lonas | G06F 21/32 |
| 2018/0232270 A1 | 8/2018 | Otsuka et al. | |
| 2019/0073676 A1* | 3/2019 | Wang | H04W 4/029 |
| 2019/0159237 A1 | 5/2019 | Wei et al. | |
| 2019/0201136 A1 | 7/2019 | Shelton, IV et al. | |
| 2019/0378610 A1 | 12/2019 | Barral et al. | |
| 2020/0028699 A1* | 1/2020 | Sharifi Mehr | H04L 9/14 |
| 2020/0029343 A1 | 1/2020 | Wang et al. | |
| 2020/0067944 A1* | 2/2020 | Dave | H04W 12/66 |
| 2020/0201336 A1 | 6/2020 | Myers et al. | |
| 2020/0312155 A1 | 10/2020 | Kelkar et al. | |
| 2020/0403991 A1* | 12/2020 | Sohail | H04L 63/1433 |
| 2021/0073098 A1 | 3/2021 | Maruyama | |
| 2021/0105250 A1 | 4/2021 | Grinius et al. | |
| 2021/0105346 A1 | 4/2021 | Pandey | |
| 2021/0282117 A1 | 9/2021 | Bivans | |
| 2021/0291835 A1 | 9/2021 | Jalali et al. | |
| 2021/0295703 A1 | 9/2021 | Jalali et al. | |
| 2022/0129900 A1* | 4/2022 | Naujok | H04W 4/029 |
| 2022/0150048 A1* | 5/2022 | Parulan | G06F 21/6245 |
| 2022/0158999 A1* | 5/2022 | Kaidi | H04L 63/0884 |
| 2022/0237295 A1* | 7/2022 | Hu | H04L 9/3263 |
| 2022/0400383 A1* | 12/2022 | Fong | H04W 12/0471 |

FOREIGN PATENT DOCUMENTS

| | | |
|---|---|---|
| WO | 2018144560 A1 | 8/2018 |
| WO | 2020132258 A1 | 6/2020 |
| WO | 2021178693 A1 | 9/2021 |

OTHER PUBLICATIONS

U.S. Appl. No. 17/332,635, filed May 27, 2021, Kerfegar Khurshed Katrak.

U.S. Appl. No. 17/332,657, filed May 27, 2021, Kerfegar Khurshed Katrak.

U.S. Appl. No. 17/856,661, filed Jul. 1, 2022, Kerfegar Khurshed Katrak.

U.S. Appl. No. 17/856,700, filed Jul. 1, 2022, Kerfegar Khurshed Katrak.

Baee et al., "Broadcast Authentication in Latency-Critical Applications: On the Efficiency of IEEE 1609.2", IEEE, Dec. 2019, retrieved on [Jul. 3, 2022]. Retrieved from the internet entire document.

Examination Report received in Australian Patent Application No. 2021232001 dated Nov. 9, 2022.

International Search Report for International Application No. PCT/US21/20911 dated Jun. 1, 2021.

International Search Report received in PCT/US2021/061275 dated Mar. 30, 2022.

International Search Report received in PCT/US2022/036002 dated Nov. 1, 2022.

Non-Final Office Action for U.S. Appl. No. 17/192,657 dated Oct. 27, 2022.

Notice of Allowance and Fees Due for U.S. Appl. No. 17/856,661 dated Oct. 13, 2022.

Notice of Allowance received in U.S. Appl. No. 17/538,948 dated Dec. 15, 2022.

O'Dwyer. "Colour-Coded Batteries—Electro-Photonic Materials Circuitry for Enhanced Electrochemical Energy Storage and Optically Encoded Diagnostics." Jan. 19, 2016 (Jan. 19, 2016) Retrieved on Oct. 10, 2022 (Oct. 10, 2022) from entire document.

* cited by examiner

METHOD FOR SCALABLE INTEGRITY ENCAPSULATION

CROSS-REFERENCE TO RELATED APPLICATIONS

This application claims the benefit of U.S. Provisional Application No. 63/289,902, filed on 15 Dec. 2021, which is incorporated in its entirety by this reference.

This application is related to U.S. patent application Ser. No. 17/856,661, filed on 1 Jul. 2022, Ser. No. 17/332,635, filed on 27 May 2021, Ser. No. 17/538,948, filed on 30 Nov. 2021, and U.S. patent application Ser. No. 17/192,657, filed on 4 Mar. 2021, each of which is incorporated in its entirety by this reference.

TECHNICAL FIELD

This invention relates generally to the field of communications security and more specifically to a new and useful method for scalable integrity encapsulation within the field of communications security.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

Figure 1:
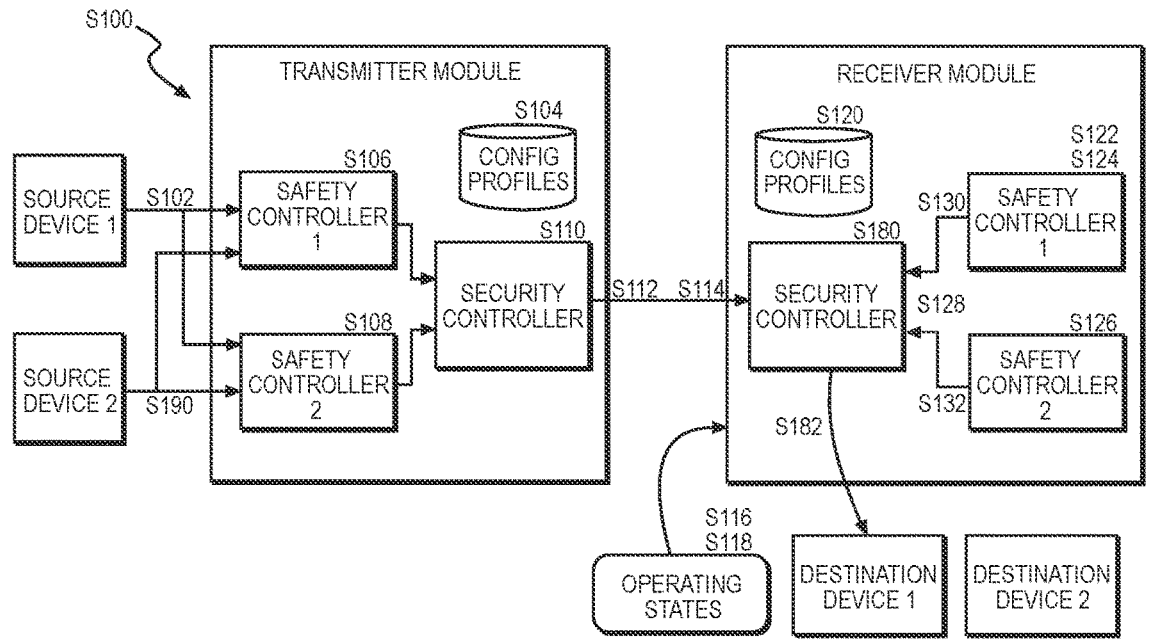
FIG. 1 is a flowchart representation of a method.
Figure 2:
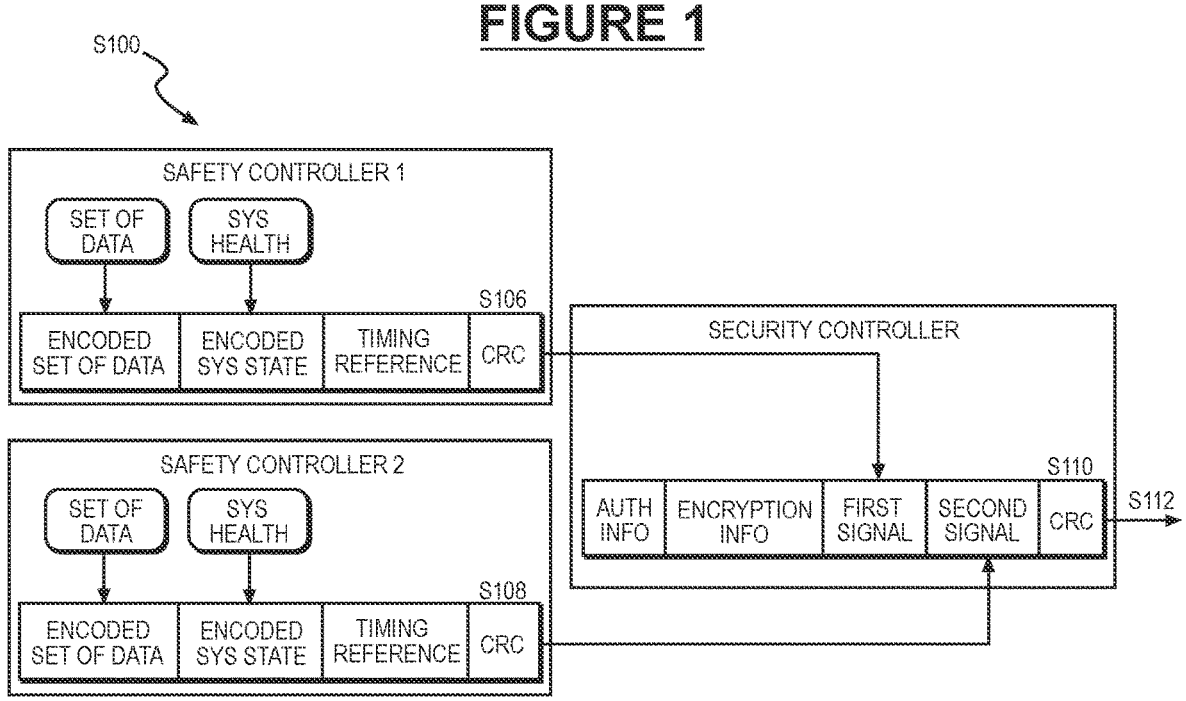
FIG. 2 is a flowchart representation of one variation of the method.
Figure 3:
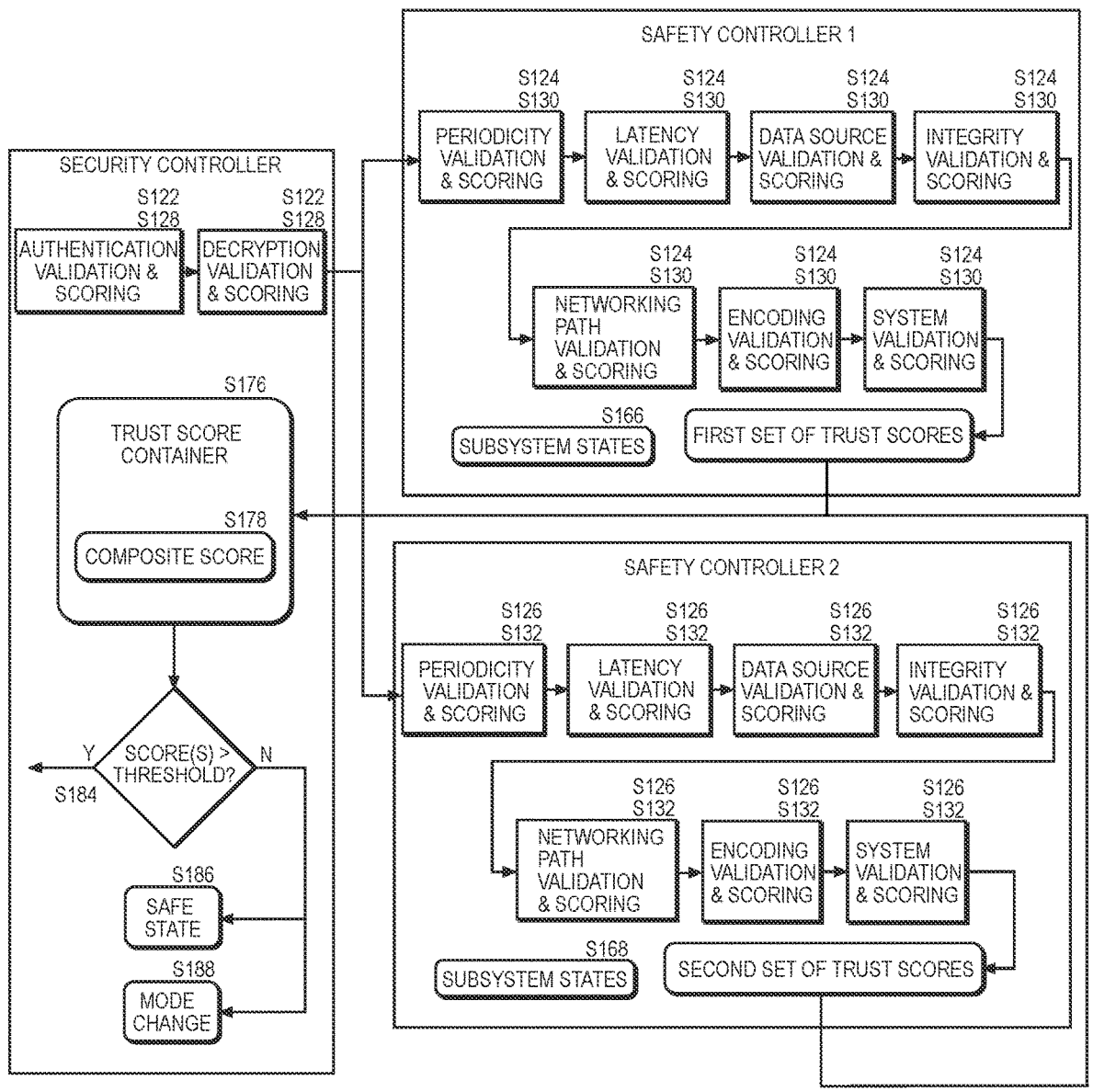
FIG. 3 is a flowchart representation of one variation of the method.

As shown in FIGS. 1-3, a method S100 includes, during a first time period, at a first communication module including a first controller and a second controller: receiving a first message from a second communication module in Block S114, the first message including a first set of data in a first data stream from a first device; accessing a first configuration profile, in a set of configuration profiles, for the first data stream in Block S120. The method S100 further includes, at the first controller: generating a first set of metrics for the first message in Block S124; and calculating a first set of trust scores for the first message based on the first set of metrics and the first configuration profile in Block S130. The method S100 further includes, at the second controller: generating a second set of metrics for the first message in Block S126; and calculating a second set of trust scores for the first message based on the second set of metrics and the first configuration profile in Block S132. The method S100 further includes, during the first time period, at the first communication module: generating a first trust score container based on the first set of trust scores and the second set of trust scores in Block S176; generating a second message including the first set of data and the first trust score vector in Block S180; and transmitting the second message to a second device in Block S182.

1.1 Variation: Redundant Signal

As shown in FIG. 1, one variation of the method S100 includes, at a first communication module including a first controller and a second controller: receiving a first set of data in a first data stream from a first device in Block S102; accessing a first configuration profile, in a set of configuration profiles, for the first data stream in Block S104; generating, at the first controller, a first signal including the first set of data in Block S106; generating, at the second controller, a second signal including the first set of data in Block S108; generating a first message according to the first configuration profile in Block S110, the first message including the first signal, the second signal, and a first data stream identifier for the first data stream; and transmitting the first message over a network in Block S112.

This variation of the method S100 further includes, at a second communication module including a third controller and a fourth controller: receiving the first message from the first communication device in Block S114; and accessing the first configuration profile for the first data stream based on the first data stream identifier in Block S120. This variation of the method S100 further includes, at the third controller: generating a first set of metrics for the first signal in Block S124; and calculating a first set of trust scores for the first signal based on the first set of metrics and the first configuration profile in Block S130. This variation of the method S100 further includes, at the fourth controller: generating a second set of metrics for the second signal in Block S126; and calculating, at the fourth controller, a second set of trust scores for the second signal based on the second set of metrics and the first configuration profile in Block S132. This variation of the method S100 further includes, at the second communication module: generating a second message, in Block S180, including the first set of data, the first set of trust scores, and the second set of trust scores; and transmitting the second message to a second device in Block S182.

1.2 Variation: Data Stream Identifier

As shown in FIG. 1, one variation of the method S100 includes, at a first communication module: receiving a first message from a second communication module in Block S114, the first message including a set of data in a first data stream from a first device and a first data stream identifier; accessing a first configuration profile, in a set of configuration profiles, for the first data stream based on the first data stream identifier in Block S120; generating a set of metrics for the first message in Block S122; calculating a set of trust scores for the first message based on the set of metrics and the first configuration profile in Block S128; generating a second message including the set of data and the set of trust scores in Block S180; and transmitting the second message to a second device in Block S182.

2. Applications

Generally, Blocks of the method S100 can be executed by a first communication module (e.g., transmitter module) to: receive data in a data stream from a source device; access a configuration profile defining requirements for the data stream; generate a first message—including the data—according to the configuration profile; and transmit the first message over a communication network to a second communication module.

Additionally, Blocks of the method S100 can be executed by the second communication module (e.g., receiver module) to: receive the first message including data in the data stream; access the configuration profile for the data stream; generate a set of metrics for first message; generate a set of trust scores for the first message based on the set of metrics and the configuration profile; generate a second message including the data in the data stream and the set of trust scores for the first message; and transmit the second message to a destination device.

2.1 Data Requirement Verification

Accordingly, Blocks of the method S100 can be executed by the communication modules to: transmit data in a data stream over a communication network according to the requirements of the data stream; generate a set of metrics for the received data; generate trust scores representing trustworthiness of the data based on these metrics and the requirements of the data stream; and communicate the data and the trust scores to a destination device consuming the data in the data stream. Therefore, because the receiver module fuses the data with trust scores representing trustworthiness of the data across multiple domains (e.g., authentication, decryption, periodicity, latency, data source, network path, data integrity, encoding, system health), a destination device can detect that the data meets requirements specific to the destination device (or fails to meet these requirements) based on these trust scores.

More specifically, Blocks of the method S100 can be executed by a communication module (e.g., receiver module) including a pair of redundant controllers to: perform redundant sets of validation processes (e.g., authentication, decryption, periodicity, latency, data source, network path, data integrity, encoding, system health) on the first message utilizing the redundant controllers; calculate redundant sets of trust scores for each set of validation processes; and generate a trust score container fusing these sets of trust scores.

Accordingly, Blocks of the method S100 can be executed by the communication module to reconcile pairs of trust scores for redundant validation processes performed on redundant signals within a message, thereby increasing accuracy in validating and scoring a message while reducing a size of a trust score container and indicating a destination device of a validation and/or scoring error (e.g., a mismatch between a first trust score and a second trust score in a pair of trust scores for a validation process).

2.2 Example

In one example application, Blocks of the method S100 are executed by a communication module communicatively coupled to a remote base station to: receive a first message including a first heartbeat signal—in a data stream of heartbeat signals—from an aerial drone; access a first configuration profile for this data stream and a first operating mode (e.g., operating in an urban area exhibiting a stable communication network) of the aerial drone; generate a first set of trust scores for the first message based on the first configuration profile; and transmit a second message including the first heartbeat signal and the first set of trust scores to the remote base station. More specifically, Blocks of the method S100 can be executed by the communication module to: receive a third message including a second heartbeat signal; detect a change in operation mode of the aerial drone to a second operating mode (e.g., operating in an uninhabited area absent a stable communication network); access a second configuration profile for this data stream and the second operating mode; generate a second set of trust scores for the third message based on the second configuration profile; and transmit a fourth message including the second heartbeat signal and the second set of trust scores to the remote base station. Therefore, the system can implement a unique configuration file for each data stream and for each operating mode of a source device and/or a destination device, thereby enabling each configuration file to define an appropriate set of requirements corresponding to the operating mode.

2.2 Communication Module

The method S100, as described herein, is executed by a communication module including two redundant controllers and a third controller to: perform redundant validation processes on a received message; and generate trust scores based on these validation processes. However, a communication module implementing additional redundant controllers (e.g., 4, 8, 16 total redundant controllers) can similarly execute Blocks of the method S100 to: perform redundant validation processes on received messages utilizing each redundant controller; and generate trust scores based on these validation processes.

3. System

Generally, as shown in FIG. 1, a system can include a first set of devices, a first communication module communicatively coupled to the first set of devices, a communication network, a second set of devices, and a second communication module communicatively coupled to the second set of devices. The system can include additional devices and/or communication modules communicatively coupled thereto.

In one implementation, the first set of devices can include a first device (or "source device") communicatively coupled to the first communication module (or "transmitter module"), and the second set of devices can include a second device (or "destination device") communicatively coupled to the second communication module (or "receiver module"). In this implementation, the source device can: generate data (e.g., safety state information, command data, control data, sensor data, status information) for the destination device; and transmit the data to the destination device via the transmitter module, the communication network, and the receiver module. More specifically, the source device can generate and output the data to the transmitter module, which can transmit a message—including the data—through the communication network. The receiver module can then receive the message and output the data to the destination device.

3.1 Devices

Generally, a source device can include a device that generates and/or outputs data to a destination device, and a destination device can include any device that receives data and/or is a target for the data. The destination device can execute an action(s) based on the data (or an absence of data).

In one example, a source device can include an aerial drone that generates and outputs a series of heartbeat signals in a data stream to a destination device, such as a remote base station. More specifically, the aerial drone can generate and output a heartbeat signal to a first communication module (as a transmitter module), which generates and transmits a first message—including the heartbeat signal—over the communication network. A second communication module (as a receiver module) can receive and output the first message to the remote base station. In response to detecting the heartbeat signal within a threshold time period, the base station can continue monitoring for a subsequent heartbeat signal.

However, in response to detecting an absence of a heartbeat signal within the threshold time period, the remote base station (as a source device) can issue a command for the aerial drone (as a destination device) to return to the remote base station. In particular, the remote base station can generate and output the command to the second communication module (as a transmitter module), which then generates and transmits a second message—including the command—over the communication network. The first communication module (as a receiver module) can receive and output the second message to the aerial drone, which can then return to the remote base station in response to detecting the command.

In another example, a device (e.g., source device, destination device) can include a sensor (e.g., radar sensor, LiDAR sensor, ultrasonic sensor, infrared camera), a machine, a robot, a vehicle (e.g., autonomous vehicle, semi-autonomous vehicle), a control system, an emergency stop system (e.g., line break sensor, emergency stop button) and/or an industrial system (e.g., manufacturing system, farming system, construction system, power system, transportation system), etc.

2.2 Communication Modules

Generally, a communication module can include: a first controller (e.g., first safety controller); a second controller (e.g., second safety controller); a third controller (e.g., security controller); and a communication bus. The communication bus can support two-way communication between the first controller and the second controller, two-way communication between the first controller and the third controller, and two-way communication between the second controller and the third controller.

In one implementation, the first controller can include: an arithmetic logic unit (hereinafter "ALU"); volatile memory (e.g., random access memory or "RAM"); and non-volatile memory (e.g., flash memory). The ALU can execute arithmetic and logic operations based on computer instructions executed by the first controller. The RAM can temporarily store data retrieved from storage for performing calculations. The flash memory can store data and/or instructions that are programmed into the first controller. The first controller can further include an input/output interface, an internal bus, and/or an internal oscillator. The first controller can include fewer or additional components.

The second controller can include analogous (e.g., similar, identical) components as the first controller. For example, the first controller and the second controller can be redundant controllers, each including identical components.

Furthermore, the third controller can include analogous (e.g., similar, identical) components as the first controller. The third controller can further include a network interface (or a set of network interfaces) for communication over the communication network.

3.3 Communication Network

Generally, the communication network can include any transmission medium (e.g., the Internet, wired communication channel, wireless communication channel) between the first communication module and the second communication module. In one example, the network can include a direct network connection between the first communication module and the second communication module. In another example, the network can include a set of interstitial relay devices (e.g., electronic relays, routers, gateways) between the first communication module and the second communication module.

4. Data Transmission

Blocks of the method S100 recite, at a first communication module including a first controller and a second controller: receiving a first set of data in a first data stream from a first device in Block S102; accessing a first configuration profile, in a set of configuration profiles, for the first data stream in Block S104; generating, at the first controller, a first signal including the first set of data in Block S106; generating, at the second controller, a second signal including the first set of data in Block S108; generating a first message according to the first configuration profile in Block S110, the first message including the first signal, the second signal, and a first data stream identifier for the first data stream; and transmitting the first message over a network in Block S112.

Generally, as shown in FIG. 1, a first communication module (e.g., transmitter module) can: receive a set of data in a data stream from a source device; access a configuration profile for the data stream; generate a message—according to the configuration profile—including the set of data; and transmit the message over the communication network to a second communication module (e.g., receiver module) communicatively coupled to a destination device.

Additionally, the first communication module can perform an authentication process (e.g., public key infrastructure (or "PKI") authentication) and/or a time synchronization process—such as described in U.S. patent application Ser. No. 17/538,948—with the source device, the second communication module, and/or the destination device.

5. Device Data Stream

In one implementation, in Block S102, the transmitter module can receive a set of data in a data stream from a source device. More specifically, the transmitter module can receive the set of data at the third controller (e.g., the security controller) of the transmitter module. Additionally or alternatively, the transmitter module can receive the set of data at a first redundant input of the first controller of the transmitter module (e.g., the first safety controller) and at a second redundant input of the second controller of the transmitter module (e.g., the second safety controller).

For example, during a first time period, the transmitter module can receive a first set of sensor data (e.g., analog value(s), digital value(s)) in a data stream from a sensor. The transmitter device can then receive a second set of data in the data stream from the sender device during a second time period succeeding the first time period.

5.1 Data Classes

Generally, the transmitter module can receive a data stream from a source device, the data stream characterized by a particular data class in a set of data classes.

In one implementation, the transmitter module can receive, from a sender device, a data stream characterized by a first data class—in the set of data classes—representing a safety critical data class. For example, the transmitter module can receive a first data stream including safety state information representing a safe state of an emergency stop device commanding a set of machines in a factory to immediately stop operation, the first data stream characterized by the first data class.

In another implementation, the transmitter module can receive, from a source device, a data stream characterized by a second data class—in the set of data classes—representing a real-time command critical data class. For example, the transmitter module can receive a second data stream including a command to a robot to pour molten metal in a mold in response to detecting a temperature of the molten metal exceeding a threshold, the second data stream characterized by the second data class.

In another implementation, the transmitter module can receive, from a source device, a data stream characterized by a third data class—in the set of data classes—representing a command critical data class. For example, the transmitter module can receive a third data stream including non-real-time instructions to an agriculture robot to control humidity in a greenhouse according to detected temperature throughout a year, the third data stream characterized by the third data class.

In another implementation, the transmitter module can receive, from a source device, a data stream characterized by a fourth data class—in the set of data classes—representing an informational data class. For example, the transmitter module can receive a fourth data stream including status information representing a battery level of a machine, the fourth data stream characterized by the fourth data class.

6. Configuration Profiles

Generally, the transmitter module can access a configuration profile for the data stream. More specifically, the transmitter module can access a configuration profile defining a set of requirements for communicating the data stream and/or messages containing data from the data stream.

In one implementation, in Block S104, in response to receiving a first set of data—in a first data stream in a set of data streams—from a first source device, the transmitter module can access a first configuration profile, in a set of configuration profiles, defining a first set of requirements for the first data stream. For example, the transmitter module can access the first configuration profile defining the first set of requirements for each message containing data from the first data stream, such as a number of redundant frames (e.g., 1, 2), a message format, error correction code (e.g., cyclic redundancy check (or "CRC"), cryptographic hash function, parity bit(s)), an encoding scheme, a periodicity requirement, a latency requirement, a source authentication requirement, and/or an encryption requirement, etc.

6.1 Configuration Profile Based on Data Class

In one implementation, the transmitter module can access a configuration profile based on a data class of the data stream. More specifically, the transmitter module can identify a data class of the data stream based on a format of the data stream, content of the data stream, an indicator within the data stream, and/or other data from the source device outputting the data stream. The transmitter module can access a configuration profile corresponding to the identified data class of the data stream.

In one example, in response to receiving a first data stream from a first source device, the transmitter module can: detect that the first data stream is characterized by a first data class—representing a safety critical data class—based on a first indicator (e.g., an indicator representing the safety critical data class) in the first data stream; and access a first configuration profile corresponding to the first data class and defining a first set of requirements for data streams within the first data class. In this example, the first set of requirements can include source authentication, encryption, two redundant frames, error correction code, variable encoding, a 25 millisecond latency threshold, and a 5 millisecond periodicity threshold.

In another example, in response to receiving a second data stream from a second source device, the transmitter module can: detect that the second data stream is characterized by a fourth data class—representing an informational data class—based on a format of the second data stream; and access a second configuration profile corresponding to the fourth data class and defining a second set of requirements for data streams within the fourth data class. In this example, the second set of requirements can include source authentication and encryption.

6.2 Configuration Profile Based on Stream ID

In one implementation, the transmitter module can access a configuration profile in the set of configuration files based on a stream identifier (or "stream ID") of the data stream. For example, the transmitter module can: detect a stream ID included within a data stream; and access a configuration profile, in the set of configuration profiles, associated with the stream ID.

Accordingly, the system can implement a unique configuration file for each data stream, thereby enabling each configuration file to define an appropriate set of requirements corresponding to the data stream.

6.3 Configuration Profile Based on Operating Mode

In one implementation, the transmitter module can access a configuration profile in the set of configuration files based on an operating mode of a source device and/or a destination device.

More specifically, the transmitter module can: detect a stream ID included within a data stream; and access a subset of configuration profiles associated with the stream ID, each configuration profile in the subset of configuration profiles corresponding to an operating mode of a source device and/or an operating mode of a destination device. In response to detecting the operating mode of the source device and/or the operating mode of the destination device, the transmitter module can access a configuration file—corresponding to the detected operating mode(s)—in the subset of configuration files.

For example, a transmitter module communicatively coupled to an aerial drone can: detect a stream ID for a data stream representing a heartbeat signal to a remote base receiver; and access a subset of configuration profiles—associated with the stream ID—including a first configuration profile for a first operating mode (e.g., operating in an urban area exhibiting a stable communication network) of the aerial drone and a second configuration profile for a second operating mode (e.g., operating in an uninhabited area absent a stable communication network) of the aerial drone. During a first time period, the transmitter module can access the first configuration profile—defining a first set of requirements (e.g., increased latency and/or periodicity requirements)—in response to detecting the first operating mode of the aerial drone (e.g., based on a first status message from the aerial drone). However, during a second time period succeeding the first time period, in response to detecting the second operating mode of the aerial drone (e.g., based on a second status message from the aerial drone), the transmitter module can access the second configuration profile defining a second set of requirements (e.g., reduced latency and/or periodicity requirements).

Accordingly, the system can implement a unique configuration file for each data stream and for each operating mode of a source device and/or a destination device, thereby enabling each configuration file to define an appropriate set of requirements corresponding to the operating mode.

7. Message Generation

As shown in FIGS. 1 and 2, the transmitter module can generate a message according to a configuration profile.

In one implementation, the transmitter module can generate a message—including a set of data in a data stream—based on a set of requirements defined in a configuration profile for the data stream.

For example, the transmitter module can access the configuration profile—defining the set of requirements including a source authentication requirement, an encryption requirement, a redundant frame requirement, an error code correction requirement, a variable encoding requirement, a periodicity requirement, and a latency requirement—for the data stream and generate a message based on this set of requirements. In this example, the transmitter module can generate a message including: source authentication information (e.g., signature); encryption session information (e.g., encryption key, encryption seed); and a set of redundant signals representing a set of data of the data stream. The set of redundant signals can include: a first signal including the set of data encoded with a first encoding scheme, a timing reference (e.g., timestamp), and a first CRC value; and a second signal including the set of data encoded with a second encoding scheme, the timing reference, and a second CRC value.

Accordingly, the transmitter module can generate messages according to a configuration profile of the data stream, thereby maintaining security and/or integrity requirements of the data stream and the entire system while communicating this data stream across an untrusted communication network.

7.1 Redundant Signals

Generally, the first controller and the second controller in the transmitter module can each generate a redundant signal including encoded data representing a set of data in a data stream, encoded data representing a state(s) of the system (e.g., controller diagnostics, system health), a timing reference, and/or error correction code.

Accordingly, the first controller and the second controller can implement different encoding schemes—exhibiting a minimum hamming distance(s) (e.g., 4, 7, 16) from each other—to generate the redundant signals, thereby enabling detection of interference, bit flips, and/or software overwrites of data within these signals.

7.1.1 First Redundant Signal

In one implementation, the first controller can: read and convert an analog voltage at an analog input pin (e.g., first redundant input of the source device communicatively coupled to the first controller) into a set of input counts; read a digital power supply signal from the ADC as a set of reference counts; correct (e.g., scales) the input counts based on the set of reference counts to calculate a corrected input count; and encode the corrected input count into a first encoded logic output value (e.g., valid codeword), such as described in U.S. patent application Ser. No. 17/332,635, filed on 27 May 2021, which is incorporated in its entirety by this reference. In this implementation, the first controller can encode the corrected input count utilizing a first encoding scheme for the first controller.

In another implementation, the first controller can: detect states (e.g., functional state, fault state) for a set of subsystems (e.g., arithmetic logic unit, random access memory, flash memory, stack overflow safety mechanism, stack underflow safety mechanism, program flow safety mechanism) within the first controller and/or an overall state of the first controller; encode these states into a first set of codewords as a first encoded system state, such as described in U.S. patent application Ser. No. 17/856,661, filed on 1 Jul. 2022, which is incorporated in its entirety by this reference. In this implementation, each codeword in the first set of codewords can exhibit a minimum hamming distance (e.g., 4, 8, 16) from another codeword in the set of codewords.

In one example, the first controller: detects a functional overall state of the first controller in response to detecting a functional state for each subsystem in a set of subsystems within the first controller; and encodes the functional overall state of the first controller as a first codeword (e.g., "1110010").

In another example, the first controller: detects a fault overall state of the first controller in response to detecting a fault state for at least one subsystem in the set of subsystems within the first controller; and encodes the fault overall state of the first controller as a second codeword (e.g., "10100100") exhibiting a minimum hamming distance (e.g., 4) from the first codeword.

In another implementation, the first controller can generate a timing reference (e.g., timestamp, sequence number) for a first signal. Additionally or alternatively, the first controller can generate an error correction code for the first signal, such as a first CRC value (e.g., 16-bit, 32-bit).

In one implementation, in Block S106, the first controller can generate a first signal (e.g., first sub-message) including the first encoded logic output value, the encoded system state, the timing reference, and/or the first CRC value.

7.1.2 Second Redundant Signal

Generally, the second controller can execute methods and techniques analogous (e.g., similar, identical) to the first controller to generate a second signal including a second encoded logic output value, a first encoded system state, a timing reference, and/or a second CRC value.

In one implementation, the second controller can read and convert an analog voltage at an analog input pin (e.g., second redundant input of the source device communicatively coupled to the second controller) into a set of input counts; read a digital power supply signal from the ADC as a set of reference counts; correct the input counts based on the set of reference counts to calculate a corrected input count; and encode the corrected input count into a second encoded logic output value (e.g., valid codeword). In this implementation, the second controller can encode the corrected input count utilizing a second encoding scheme—different from the first encoding scheme—for the second controller. For example, the second controller can encode the corrected input count into the second encoded logic output value exhibiting a minimum hamming distance (e.g., 4, 8, 16) from the first encoded logic output value.

In another implementation, the second controller can: detect states for a set of subsystems within the second controller and/or an overall state of the second controller; and encode these states into a second set of codewords as a second encoded system state. In this implementation, each codeword in the set of codewords can exhibit a minimum hamming distance (e.g., 4, 8, 16) from another codeword in the set of codewords. In this implementation, each codeword in the second set of codewords can exhibit a minimum hamming distance (e.g., 4, 8, 16) from another codeword in the second set of codewords and/or from a codeword in the first set of codewords.

In another implementation, the second controller can generate a timing reference (e.g., timestamp, sequence number) for a second signal. Additionally or alternatively, the first controller can generate an error correction code for the second signal, such as a second CRC value (e.g., 16-bit, 32-bit).

In one implementation, in Block S108, the second controller can generate a second signal (e.g., second sub-message) including the second encoded logic output value, the first encoded system state, the timing reference, and/or the second CRC value.

7.2 Signal Concatenation

Generally, the transmitter module can generate a message including the first signal, the second signal, a stream identifier (e.g., stream ID) of the data stream, and/or error correction code. More specifically, the third controller (e.g., security controller) can concatenate the first signal and the second signal from the first controller and the second controller, respectively.

In one implementation, in Block S110, the third controller can generate a message including the first signal, the second signal, a stream ID for the data stream, and/or error correction code, such as a third CRC value (e.g., cumulative CRC value) for the message.

Additionally, the third controller can generate the message further including authentication information. For example, the third controller can generate the message further including a data source identifier based on a device identifier (e.g., MAC address) and a unique key (e.g., secure key) for the source device, and/or a signature(s) (e.g., transmitter module signature, source device signature). The transmitter module can generate the message further including destination information, such as a destination identifier based on a device identifier (e.g., MAC address) and a unique key (e.g., secure key) for the destination device.

The third controller can generate the message further including encryption session information (e.g., encryption key).

In one implementation, in Block S112, the transmitter module (e.g., third controller of the transmitter module) can transmit the message across the communication network.

8. Data Reception

Blocks of the method S100 recite: receiving a first message from a second communication module in Block S114, the first message including a set of data in a first data stream from a first device and a first data stream identifier; and accessing a first configuration profile, in a set of configuration profiles, for the first data stream based on the first data stream identifier in Block S120.

Generally, a second communication module (e.g., receiver module) can: receive the message over the communication network; associate the message with a data stream; and access a configuration file for the data stream.

8.1 Stream Classification & Configuration Profile Access

Generally, the receiver module can: receive the message from the transmitter module; associate (or classify) the message with a data stream; and access a configuration profile defining a set of requirements for the data stream and/or for messages including data in the data stream.

8.1.1 Stream Classification Based on Stream ID

In one implementation, in Block S114, during a first time period, the receiver module can receive a first message—including a first set of data in a first data stream from a first device and a first data stream identifier (e.g., stream ID)—from the transmitter module. The receiver module can access a first configuration profile, in a set of configuration profiles, for the first data stream based on the first data stream identifier in Block S120. In this implementation, the receiver module can access the first configuration profile from a repository storing the set of configuration profiles for a set of data streams, each configuration profile in the set of configuration profiles corresponding to a data stream identifier and defining a set of requirements for a data stream.

8.1.2 Stream Classification Based on Operating Mode

Blocks of the method S100 recite, during the first time period: detecting a first operating mode of the first device from a first set of operating modes for the first device in Block S116; detecting a second operating mode of the second device from a second set of operating modes for the second device in Block S118, and accessing the first configuration profile for the first data stream based on the first operating mode of the first device and the second operating mode of the second device in Block S120.

Generally, the receiver module can: detect an operating mode of a source device and/or an operating mode of a destination device; and access a configuration profile in the set of configuration files based on the operating mode of a source device and/or the operating mode of the destination device.

In one implementation, in Block S116, the receiver module can detect an operating mode of the source device. For example, the receiver module can detect the operating mode of the source device based on the first message, such as based on state data within the first message, an indicator representing an operating mode of the source device within the first message, and/or other data within the first message. Additionally or alternatively, the receiver module can detect the operating mode of the source device based on data included in a prior message from the transmitter module, the source device, and/or another device.

Similarly, in Block S118, the receiver module can detect an operating mode of the destination device. For example, the receiver module can detect an operating mode of the destination device based on a message—including state data, an indicator representing the operating state of the destination device, and/or other data—from the destination device. Additionally or alternatively, the receiver module can detect the operating mode of the destination device based on data included within a message from another device.

The receiver module can: detect the first data stream identifier included within the first message; and access a subset of configuration profiles associated with the first stream identifier, each configuration profile in the subset of configuration profiles corresponding to an operating mode of a source device and/or an operating mode of a destination device. In response to detecting the operating mode of the source device and/or the operating mode of the destination device, the receiver module can access a configuration file—corresponding to the detected operating mode(s)—in the subset of configuration files.

For example, during a first time period, a receiver module communicatively coupled to a remote base station can: receive a first message including a stream ID for a data stream representing a heartbeat signal from an aerial drone; and access a subset of configuration profiles—associated with the stream ID—including a first configuration profile for a first operating mode (e.g., operating in an urban area exhibiting a stable communication network) of the aerial drone and a second configuration profile for a second operating mode (e.g., operating in an uninhabited area absent a stable communication network) of the aerial drone. The receiver module can then: detect the first operating mode of the aerial drone (e.g., based on a first indicator representing the first operating mode in the first message); and access the first configuration profile—defining a first set of requirements (e.g., increased latency and/or periodicity requirements)—for the first data stream.

During a second time period succeeding the first time period, the receiver module can: receive a second message including the stream ID for a data stream representing a heartbeat signal from an aerial drone; and access the subset of configuration profiles associated with the stream ID. The receiver module can then: detect the second operating mode of the aerial drone (e.g., based on a second indicator representing the second operating mode in the second message); and access the second configuration profile—defining a second set of requirements (e.g., reduced latency and/or periodicity requirements)—for the first data stream.

Accordingly, the system can implement a unique configuration file for each data stream and for each operating mode of a source device and/or a destination device, thereby enabling each configuration file to define an appropriate set of requirements corresponding to the operating mode.

8.1.3 Stream Classification Based on Source Device & Destination Device

In one variation, the receiver module can receive a first message—excluding a data stream identifier—from the transmitter module. In this variation, the receiver module can receive a first message from the transmitter module, the first message including: a first set of data in a first data stream from a first device; a data source identifier; and/or a destination identifier. The receiver module can associate the first message with the first data stream, in the set of data streams, based on the data source identifier and/or the destination identifier. More specifically, the receiver module can associate the first message with the first data stream based on a mapping of the data source identifier and the destination identifier to the first data stream identifier; assign the first data stream identifier—representing the first data stream—to the first message based on the data source identifier and/or the destination identifier; and access the first configuration profile based on the first data stream identifier.

8.1.4 Stream Classification Based on Data Class

Blocks of the method S100 recite, wherein receiving the first message comprises receiving the first message further including a first indicator representing a safety critical data class in a set of data classes; and wherein accessing the first configuration profile includes accessing the first configuration profile for the first data stream based on the first indicator.

In another variation, the receiver module can receive a first message—including a first set of data in a first data stream from a first device and excluding a data stream identifier—from the transmitter module. In this variation, the receiver module can identify a data class of the data stream, in a set of data classes, based on a format of the first message, a format of the first set of data, content of the first message, content of the first set of data, an indicator within the first message, an indicator within the first set of data, and/or other data in the first message. The receiver module can then access a configuration profile corresponding to the identified data class.

8.2 Message Authentication, Decryption & Processing

In one implementation, the receiver module can authenticate the first message.

For example, the receiver module can authenticate the first message based on a data source identifier in the first message. More specifically, the receiver module can: detect a first data source identifier in the first message; access a communication authorization list including the first data source identifier; and authenticate the first message based on inclusion of the first data source identifier in the communication authorization list.

Additionally or alternatively, the receiver module can authenticate the first message based on a signature (e.g., signature of the source device, signature of the transmitter module) in the first message.

In another implementation, the receiver module can decrypt the first message. For example, the receiver module can decrypt the first message based on encryption session information included in the first message.

In another implementation, the receiver module can verify the cumulative CRC in the first message.

In another implementation, the receiver module can separate the first signal and the second signal from the first message. More specifically, the third controller (e.g., security controller) in the receiver module can: separate the first signal and the second signal from the first message; output the first signal to a first controller (e.g., first safety controller) in the receiver module; and output the second signal to a second controller (e.g., second safety controller) in the receiver module.

9. Message Validation & Scoring

Blocks of the method S100 recite: generating a set of metrics for the first message in Block S122; and calculating a set of trust scores for the first message based on the set of metrics and the first configuration profile in Block S128.

Generally, the receiver module can validate a received message—including a set of data in a data stream—according to a configuration profile for the data stream. More specifically, the receiver module can: access a configuration profile defining a set of requirements for the data stream and/or for a message containing data in the data stream; generate metrics for the message; and calculate a set of trust scores for the message based on these metrics and the configuration profile.

9.1 Validation Types & Trust Scores

Generally, the receiver module can perform a set of validation processes on the message. For example, the receiver module can perform an authentication validation process, a decryption validation process, a periodicity validation process, a latency validation process, a data source validation process, a network path validation process, an integrity validation process, and/or an encoding validation process, and/or a system trust (e.g., system health) validation process.

In one implementation, in Block S122, the receiver module can generate a metric (or subset of metrics)—in a set of metrics for the message—for each validation process on the message. In Block S128, for each validation process, the receiver module can generate a trust score (or a subset of trust scores) for the message based on the metric(s) and the configuration profile defining a requirement (or a subset of requirements) corresponding to the validation process. For example, the receiver module can generate a trust score based on an output of a model quantifying a metric for the message (e.g., residual error rate for a CRC-protected message). Additionally or alternatively, the receiver module can generate a trust score based on a relative performance of a metric for the message (e.g., 0-100%).

More specifically, the receiver module can generate a trust score (or a subset of trust scores) for each validation process on the message based on the metric(s) and the configuration profile mapping of a set of values of the metric to a set of trust scores, each trust score in the set of trust scores corresponding to a value in the set of values. The receiver module can generate a set of trust scores for a message, including an authentication trust score, a decryption trust score, a periodicity trust score, a latency trust score, a data source trust score, a network path trust score, a data integrity trust score, an encoding trust score, and/or a system health trust score (e.g., system health trust score, transmitter health score, receiver health score).

For example, the receiver module can access a configuration profile mapping: a first trust score (e.g., 100%) for a message based on authorization verification of the source device by a trusted certificate authority; a second trust score (e.g., 50%) based on authorization verification of the source device by an unknown certificate authority; and a third trust score (e.g., 0%, 25%, 50%) based on an absence of authorization verification of the source device. In this example, the receiver module can: generate a metric—representing verification of the source device by a trusted certificate authority—for a first message; and calculate the first trust score (e.g., 100%) for the first message based on the mapping defined in the configuration profile.

Additionally or alternatively, for each validation process, the receiver module can generate a trust score (or a subset of trust scores) for the message based on the metric(s) and the configuration profile mapping of a set of ranges of values of the metric to a set of trust scores, each trust score in the set of trust scores corresponding to a range of values in the set of ranges of values.

In one example, the receiver module can access a configuration profile mapping: a first trust score (e.g., 100%) for a message based on a detected latency for a message falling within a first range (e.g., 0-10 milliseconds); a second score (e.g., 50%) based on a detected latency for the message falling within a second range (e.g., 10-25 milliseconds); and a third score (e.g., 0%) based on a detected latency for the message falling within a third range (e.g., exceeding 25 milliseconds). In this example, the receiver module can detect a latency of 12 milliseconds for a first message; and calculate the second score (e.g., 50%) for the first message in response to detecting the latency falling within the second range.

9.1.1 Redundant Validation and Scoring

Blocks of the method S100 recite, at the first controller: generating a first set of metrics for the first message in Block S124; and calculating a first set of trust scores for the first message based on the first set of metrics and the first configuration profile in Block S130. Blocks of the method S100 further recite, at the second controller: generating a second set of metrics for the first message in Block S126; and calculating a second set of trust scores for the first message based on the second set of metrics and the first configuration profile in Block S132.

Blocks of the method S100 recite, at the third controller: generating a first set of metrics for the first signal in Block S124; and calculating a first set of trust scores for the first signal based on first set of metrics and the first configuration profile in Block S130. Blocks of the method S100 further recite, at the fourth controller: generating a second set of metrics for the second signal in Block S126; and calculating, at the fourth controller, a second set of trust scores for the second signal based on the second set of metrics and the first configuration profile in Block S132.

Generally, as shown in FIG. 3, each controller (e.g., first safety controller, second safety controller, security controller) within the receiver module can perform each validation process in the set of validation processes on the message. More specifically, the first controller (e.g., first safety controller) within the receiver module can: perform each validation process in the set of validation processes on the message and/or the first signal (e.g., first sub-message) within the message; and calculate a first set of trust scores (e.g., a first authentication trust score, a first decryption trust score, a first periodicity trust score, a first latency trust score, a first data source trust score, a first network path trust score, a first data integrity trust score, a first encoding trust score, and/or a first system health trust score) based on each validation process by the first controller. Additionally, the second controller (e.g., second safety controller) within the receiver module can perform each validation process in the set of validation processes on the message and/or the second signal (e.g., second sub-message) within the message; and calculate a second set of trust scores (e.g., a second authentication trust score, a second decryption trust score, a second periodicity trust score, a second latency trust score, a second data source trust score, a second network path trust score, a second data integrity trust score, a second encoding trust score, and/or a second system health trust score) based on each validation process by the second controller.

In one implementation, the first controller can: generate a first set of metrics for the first message in Block S124; and calculate a first set of trust scores for the first message based on the first set of metrics and the first configuration profile in Block S130. Additionally, the second controller can: generate a second set of metrics for the first message in Block S126; and calculate a second set of trust scores for the first message based on the second set of metrics and the first configuration profile in Block S132.

Accordingly, the receiver module can perform redundant validation and scoring of a message, thereby ensuring a higher level of assurance of an accuracy of each validation process and corresponding trust score(s).

9.1.2 Authentication Validation & Scoring

In one implementation, in Block S122, the receiver module (e.g., first controller, second controller, third controller) can generate a metric (or a subset of metrics) for an authentication validation process on a message. For example, the receiver module can generate a subset of metrics based on: a duration of elapsed time since authentication of the source device; authentication verification by a certificate authority (or another certificate chain); a level of trust of the certificate chain; a number of source authentication certificates (e.g., single source authentication certificate, multiple source authentication certificates); presence of a certificate corresponding to the source device on a revocation list; and/or an age of the revocation list.

In another implementation, in Block S128, the receiver module can calculate a trust score (e.g., authentication trust score) for the message based on the subset of metrics and the configuration profile. More specifically, the first controller can calculate a first authentication trust score for the message based on a first subset of metrics; and the second controller can calculate a second authentication trust score for the message based on a second subset of metrics.

In one example, the receiver module can: generate a first subset of metrics—representing authentication of the source device by a trusted certificate authority within a threshold time period (e.g., 24 hours)—for a first message; and calculate a first score (e.g., 100%) for the first message based on the first subset of metrics and a first configuration profile defining a first requirement requiring authentication of the source device by a trusted certificate authority within the threshold time period.

In another example, the receiver module can generate a second subset of metrics—representing authentication of the source device by an unknown certificate authority beyond the threshold period of time—for a second message; and calculate a second score (e.g., 0%, 25%, 50%) for the first message based on the second subset of metrics and the first configuration profile defining the first requirement requiring authentication of the source device by a trusted certificate authority within the threshold time period.

9.1.3 Decryption Validation & Scoring

In one implementation, the receiver module can execute similar methods and techniques to: generate a metric (or a subset of metrics) for a decryption validation process on a message in Block S122; and calculate a trust score (e.g., decryption trust score) for the message based on the metric and the configuration profile in Block S128. More specifically, the first controller can generate a first subset of metrics for a decryption validation process and calculate a first decryption trust score for the message based on the first subset of metrics; and the second controller can generate a second subset of metrics for a decryption validation process and calculate a second decryption trust score for the message based on the second subset of metrics.

For example, the receiver module can generate a subset of metrics based on: a type of cryptography utilized in the message; a level of strength of cryptography utilized in the message; a probability of compromise of a secret key utilized in the message (e.g., compromise in a key agreement process, compromise in key storage, compromise in utilization); and/or a number of different keys and/or ciphers utilized in the message (e.g., a different key for each redundant signal in the message, a different cipher for each redundant signal in the message). In response to detecting a first encryption key for a first signal in the first message and a second encryption key—different from the first encryption key—for a second signal in the first message, the receiver module can then calculate a first trust score (e.g., 100%) for the first message based on the configuration profile mapping the first trust score to a metric value representing two different encryption keys utilized in two redundant signals within a message.

9.1.4 Periodicity Validation & Scoring

Blocks of the method S100 recite, recording a second time representing a reception time of the first message at the first communication module in Block S134; accessing a first time representing a reception time of a prior message at the first communication module in Block S136; and calculating a first period of the first message based on a difference between the first time and the second time in Block S138, wherein calculating the first set of trust scores comprises calculating a first trust score in the first set of trust scores in response to detecting a difference between the first period and a target period falling below a threshold.

Blocks of the method S100 further recite, during a second time period succeeding the first time period, at the first communication module: receiving a second message from the second communication module in Block S114; recording a third time representing a reception time of the second message at the first communication module in Block S134; calculating a second period of the second message based on a difference between the second time and the third time in Block S136; and calculating a second trust score for the second message in response to detecting a difference between the second period and the target period exceeding the threshold in Block S142, the second trust score falling below the first trust score.

In one implementation, the receiver module can execute similar methods and techniques to: generate a metric (or a subset of metrics) for a periodicity validation process on a message in Block S122; and calculate a trust score (e.g., periodicity trust score) for the message based on the metric and the configuration profile in Block S128. More specifically, the first controller can generate a first subset of metrics for a periodicity validation process in Block S124 and calculate a first periodicity trust score for the message based on the first subset of metrics in Block S130; and the second controller can generate a second subset of metrics for a latency periodicity process in Block S126 and calculate a second periodicity trust score for the message based on the second subset of metrics in Block S132.

For example, the receiver module can generate a subset of metrics based on: a period of a message (e.g., a difference between a receipt time of a message and a receipt time of a prior message); a predefined period for a data stream (e.g., a period defined in a configuration profile); and/or an average period for messages in a data stream.

Figure 4:
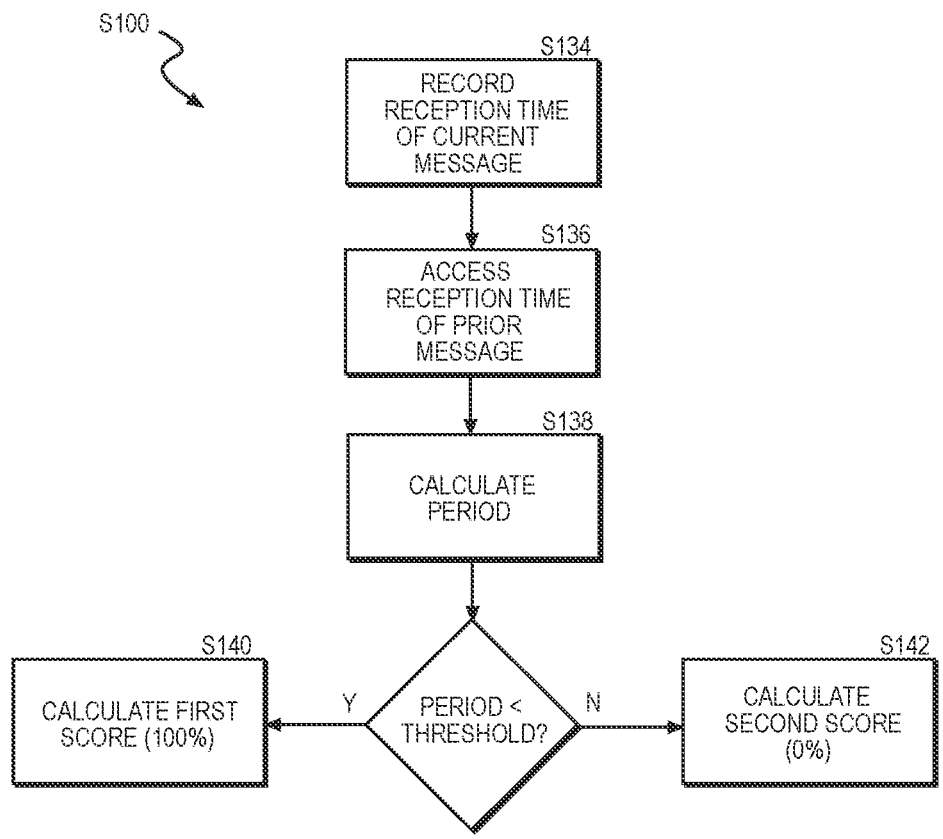
FIG. 4 is a flowchart representation of one variation of the method.

Generally, as shown in FIG. 4, the receiver module can detect a period of a message based on a recorded receipt time of the message and a recorded receipt time of a prior message. The receiver module can: calculate a difference between the detected period and a target period (e.g., a target period defined in a configuration profile, an average period duration for a data stream); and generate a trust score based on this difference and a threshold duration of time (e.g., a threshold duration of time defined in the configuration profile).

In one implementation, during a first time period, the first controller in the receiver module can: receive a first message at the receiver module in Block S114; record a second time representing a reception time of the first message at the receiver module in Block S134; access a first time representing a reception time of a prior message at the receiver module in Block S136; and calculate a first period of the first message based on a difference between the first time and the second time in Block S138. The first controller can then calculate a first trust score (e.g., 100%) in the first set of trust scores in response to detecting a difference (e.g., 5 milliseconds) between the first period and a target period falling below a threshold (e.g., 15 milliseconds) in Block S140.

However, during a second time period succeeding the first time period, the first controller can: receive a second message at the receiver module in Block S114; record a third time representing a reception time of the second message at the receiver module in Block S134; calculate a second period of the second message based on a difference between the second time and the third time in Block S138; and calculate a second trust score (e.g., 0%, 25%, 50%) for the second message in response to detecting a difference (e.g., 25 milliseconds) between the second period and the target period exceeding the threshold in Block S142, the second trust score falling below the first trust score.

9.1.5 Latency Validation & Scoring

Blocks of the method S100 recite, wherein receiving the first message includes receiving the first message further comprising a first timing reference specifying a second time; further including, during the first time period, recording a first time representing a reception time of the first message at the first communication module in Block S134; and wherein calculating the first set of trust scores includes calculating a first trust score in the first set of trust scores in response to detecting a difference between the first time and the second time falling below a threshold in Block S144.

Blocks of the method S100 further recite, during a second time period succeeding the first time period, at the first communication module: receiving a second message from the second communication module including a second timing reference specifying a third time in Block S114; recording a fourth time representing a reception time of the second message at the first communication module in Block S134; calculating a second trust score for the second message in response to detecting a difference between the third time and the fourth time exceeding the threshold, the second trust score falling below the first trust score in Block S146.

In one implementation, the receiver module can execute similar methods and techniques to: generate a metric (or a subset of metrics) for a latency validation process on a message in Block S122; and calculate a trust score (e.g., latency trust score) for the message based on the metric and the configuration profile in Block S128. More specifically, the first controller can generate a first subset of metrics for a latency validation process in Block S124 and calculate a first latency trust score for the message based on the first subset of metrics in Block S130; and the second controller can generate a second subset of metrics for a latency validation process in Block S126 and calculate a second latency trust score for the message based on the second subset of metrics in Block S132.

For example, the receiver module can generate a subset of metrics based on: a latency (e.g., transmission latency) of a message (e.g., a difference between a receipt time of a message and a timing reference included in the message); a predefined threshold latency for a data stream (e.g., a threshold latency defined in a configuration profile); an average latency for messages in a data stream; and/or an accuracy of time synchronization between the receiver module and the transmitter module.

Figure 5:
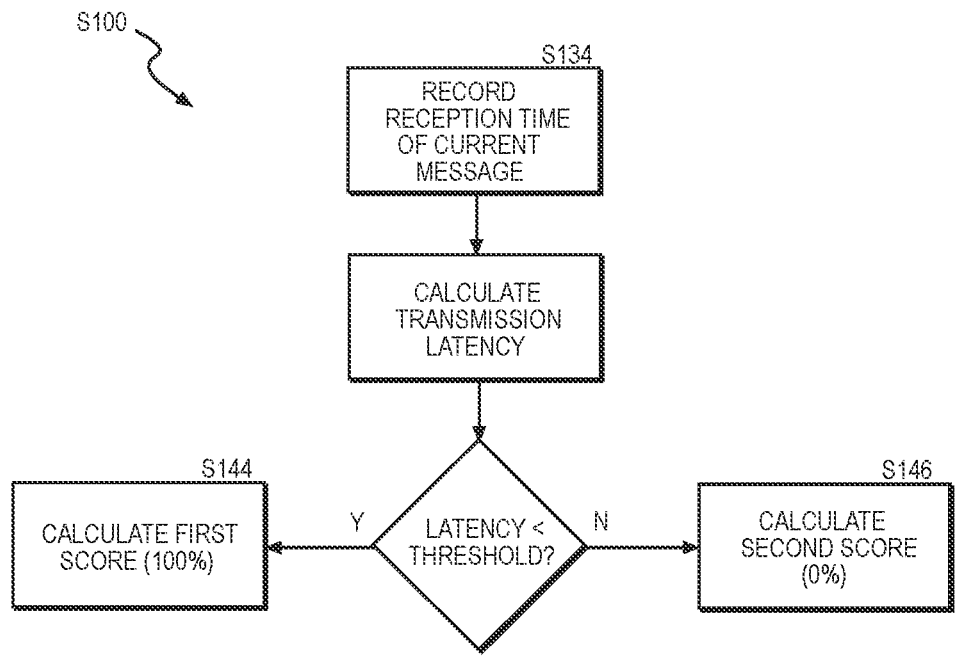
FIG. 5 is a flowchart representation of one variation of the method.

Generally, as shown in FIG. 5, the receiver module can detect latency (e.g., current latency, cumulative latency) of a message based on a recorded receipt time of the message and a timing reference (e.g., timestamp included in the message, message schedule), such as described in U.S. patent application Ser. No. 17/538,948. The receiver module can: calculate a difference between the receipt time and the timing reference; and generate a trust score based on this difference and a threshold latency (e.g., a threshold latency defined in the configuration profile, a threshold latency representing an average latency of messages in a data stream, a threshold latency representing a cumulative latency of messages in the data stream).

In one implementation, during a first time period, the receiver module can: receive a first message—including a first timing reference specifying a second time—at the receiver module in Block S114; record a first time representing a reception time of the first message at the receiver module in Block S134; and calculate a first trust score (e.g., 100%) in the first set of trust scores in response to detecting a difference (e.g., 40 milliseconds) between the first time and the second time falling below a threshold (e.g., 50 milliseconds) in Block S144.

However, during a second time period succeeding the first time period, the receiver module can: receive a second message—including a second timing reference specifying a third time—at the receiver module in Block S114; record a fourth time representing a reception time of the second message at the receiver module in Block S134; and calculate a second trust score (e.g., 0%, 25%, 50%) for the second message in response to detecting a difference (e.g., 100 milliseconds) between the third time and the fourth time exceeding the threshold in Block S146, the second trust score falling below the first trust score.

9.1.6 Data Source Validation & Scoring

Blocks of the method S100 recite, wherein receiving the first message includes receiving the first message further including a first data source identifier representing the first device in Block S114, the first data source identifier including a first device identifier and a first unique identifier.

Blocks of the method S100 further recite, wherein calculating the first set of trust scores includes: calculating a first sub-score for the first device identifier in response to detecting a mismatch between the first device identifier and a set of known device identifiers in Block S148; calculating a second sub-score for the first unique identifier in response to detecting a match between the first unique identifier and a set of trusted unique identifiers in Block S150, the second score exceeding the first score; and calculating a first trust score in the first set of trust scores based on the first score and the second score in Block S152.

In one implementation, the receiver module can execute similar methods and techniques to: generate a metric (or a subset of metrics) for a data source validation process on a message in Block S122; and calculate a trust score (e.g., data source trust score) for the message based on the metric and the configuration profile in Block S126. More specifically, the first controller can generate a first subset of metrics for a data source validation process in Block S124 and calculate a first data source trust score for the message based on the first subset of metrics in Block S130, and the second controller can generate a second subset of metrics for a data source validation process in Block S126 and calculate a second data source trust score for the message based on the second subset of metrics in Block S132.

For example, the receiver module can generate a subset of metrics based on: a data source identifier of a source device included in a message; a device identifier of the source device included in the message; a unique identifier of the source device included in the message; and/or status information associated with the source device.

Figure 6:
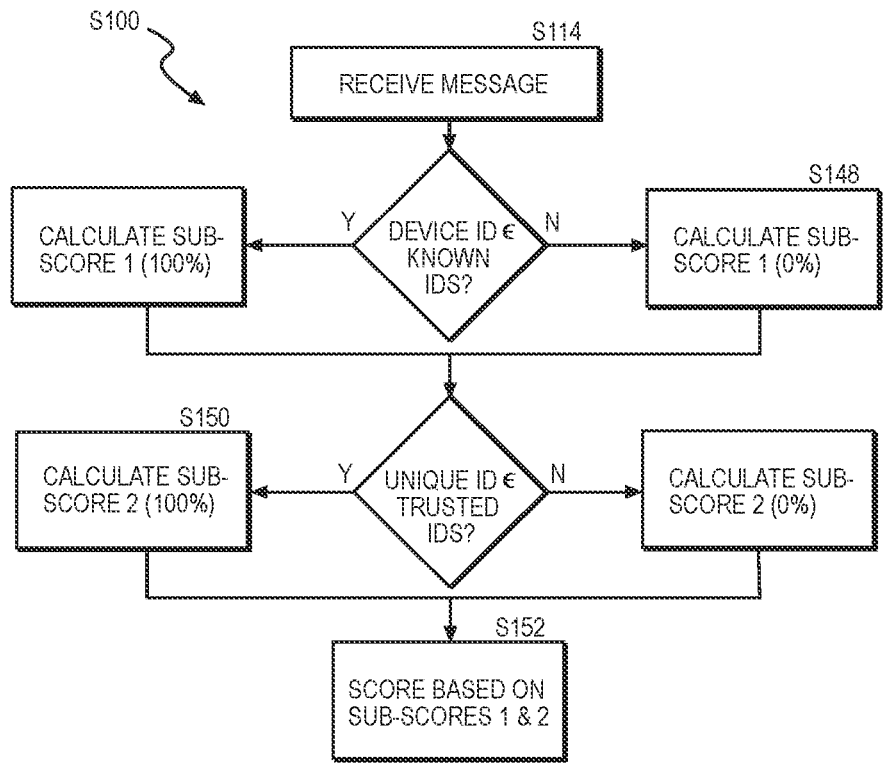
FIG. 6 is a flowchart representation of one variation of the method.

Generally, as shown in FIG. 6, the receiver module can detect a data source identifier associated with a message. More specifically, the receiver module can detect a data source identifier—including a device identifier and/or a unique identifier—within a message. The receiver module can: calculate a first sub-score for the message based on inclusion (or non-inclusion) of the device identifier in a set of known device identifiers; calculate a second sub-score for the message based on inclusion (or non-inclusion) of the unique identifier in a set of trusted unique identifiers; and calculate a composite score for the message based on the first sub-score and the second sub-score.

In one implementation, in Block S114, the receiver module can receive a first message including a first data source identifier—including a first device identifier and a first unique identifier—representing a first device (e.g., a source device).

In another implementation, in Block S148, the receiver module can calculate a score (e.g., a first sub-score) for the first device identifier based on the first device identifier and a set of known device identifiers. In one example, the receiver module can calculate a first score (e.g., 100%) for the first device identifier in response to detecting a match between the first device identifier and a set of known device identifiers. In another example, the receiver module can calculate a second score (e.g., 0%, 25%, 50%) for the first device identifier in response to detecting a mismatch between the first device identifier and a set of known device identifiers (i.e., the first device identifier is absent from the set of known device identifiers), the second score falling below the first score.

In another implementation, in Block S150, the receiver module can calculate a score (e.g., a second sub-score) for the first unique identifier based on the first unique identifier and a set of trusted unique identifiers. In one example, the receiver module can calculate a first score (e.g., 100%) for the first unique identifier in response to detecting a match between the first unique identifier and a set of trusted unique identifiers. In another example, the receiver module can calculate a second score (e.g., 0%, 25%, 50%) for the first unique identifier in response to detecting a mismatch between the first device identifier and a set of known unique identifiers (i.e., the first unique identifier is absent from the set of trusted unique identifiers), the second score falling below the first score.

In another implementation, in Block S152, the receiver module can calculate a first trust score in the first set of trust scores based on the first score and the second score. For example, the receiver module can calculate the first trust score characterized by a product of the first sub-score and the second sub-score.

9.1.7 Network Path Validation & Scoring

In one implementation, the receiver module can execute similar methods and techniques to: generate a metric (or a subset of metrics) for a network path validation process on a message in Block S122; and calculate a trust score (e.g., network path trust score) for the message based on the metric and the configuration profile in Block S128. More specifically, the first controller can generate a first subset of metrics for a network path validation process in Block S124 and calculate a first network path trust score for the message based on the first subset of metrics in Block S130; and the second controller can generate a second subset of metrics for a network path validation process in Block S126 and calculate a second network path trust score for the message based on the second subset of metrics in Block S132.

For example, the receiver module can generate a subset of metrics based on an interface (e.g., network interface), of a set of interfaces, of the receiver module. More specifically, the receiver module can detect that a first message is received at a target (e.g., expected) interface (or received at an interface different from the target interface); and generate a subset of metrics in response to detecting that the first message is received at the target interface. In response to detecting that the first message is received at the target interface, the receiver module can calculate a first trust score (e.g., 100%) for the first message based on the configuration profile mapping the first trust score to a metric value representing receipt of a message at a target interface. However, in response to detecting that the first message is received at another interface (e.g., non-target interface), the receiver module can calculate a second trust score (e.g., 0%, 25%, 50%) for the first message based on the configuration profile mapping the second trust score to a metric value representing receipt of a message at a non-target interface.

10.1.8 Data Integrity Validation & Scoring

In one implementation, the receiver module can execute similar methods and techniques to: generate a metric (or a subset of metrics) for a data integrity validation process on a message in Block S122; and calculate a trust score (e.g., data integrity trust score) for the message based on the metric and the configuration profile in Block S128. More specifically, the first controller can generate a first subset of metrics for a data integrity validation process in Block S124 and calculate a first data integrity trust score for the message based on the first subset of metrics in Block S130; and the second controller can generate a second subset of metrics for a data integrity validation process in Block S126 and calculate a second data integrity trust score for the message based on the second subset of metrics in Block S132.

For example, the receiver module can generate a subset of metrics based on: an expected error for a checksum based on a cumulative CRC for a message characterized by a particular message size; a number of CRC values within a message; a number of CRC values for each sub-message; and/or a result of a verification of each CRC value in the message. More specifically, the receiver module can execute similar methods and techniques as described in U.S. patent application Ser. No. 17/192,657, filed on 4 Mar. 2021, which is incorporated in its entirety by this reference, to decode and/or verify messages utilizing error codes in two or more controllers.

In response to detecting each CRC value in the first message passing verification, the receiver module can calculate a first trust score (e.g., 100%) for the first message based on the configuration profile mapping the first trust score to a metric value representing verification of all CRC values in a message. However, in response to detecting a CRC value (or a subset of CRC values) in the first message failing verification, the receiver module can calculate a second trust score (e.g., 0%, 25%, 50%) for the first message based on the configuration profile mapping the second trust score to a metric value representing an error in a CRC value (or a subset of CRC values) in a message.

9.1.9 Encoding Validation & Scoring

Blocks of the method S100 recite: at the first controller, decoding the first set of data encoded according to the first encoding scheme in Block S154; and at the second controller, decoding the first set of data encoded according to the second encoding scheme in Block S156, the first set of data encoded according to the second encoding scheme exhibiting a minimum hamming distance from the first set of data encoded according to the first encoding scheme.

Blocks of the method S100 further recite: wherein receiving the first message includes receiving the first message including a first signal including the first set of data encoded according to a first encoding scheme and a second signal including the first set of data encoded according to a second encoding scheme; wherein generating the first set of metrics for the first message includes generating the first set of metrics for the first signal; and generating the second set of metrics for the first message includes generating the second set of metrics for the second signal.

Blocks of the method S100 further recite: calculating the first set of trust scores for the first message includes calculating a first trust score in the first set of trust scores in response to detecting a match between the first set of data encoded according to the first encoding scheme and a valid codeword in the first encoding scheme in Block S162; and calculating the second set of trust scores for the first message includes calculating a second trust score in the second set of trust scores in response to detecting a mismatch between the first set of data encoded according to the second encoding scheme and a valid codeword in the second encoding scheme in Block S164, the second trust score falling below the first trust score.

In one implementation, the receiver module can execute similar methods and techniques to: generate a metric (or a subset of metrics) for an encoding validation process on a message in Block S122; and calculate a trust score (e.g., encoding trust score) for the message based on the metric and the configuration profile in Block S128. More specifically, the first controller can generate a first subset of metrics for an encoding validation process in Block S124 and calculate a first encoding trust score for the message based on the first subset of metrics in Block S130, and the second controller can generate a second subset of metrics for an encoding validation process in Block S126 and calculate a second encoding trust score for the message based on the second subset of metrics in Block S132.

For example, the receiver module can generate a subset of metrics based on: a sub-message structure of the message;

validity of encodings of each sub-message; and/or a number of diverse encoding schemes utilized in the message.

In one implementation, in Block S114, the receiver module can receive a first message including a first signal comprising the first set of data encoded according to a first encoding scheme; and second signal comprising the first set of data encoded according to a second encoding scheme. The receiver module can: generate a first set of metrics for the first signal in Block S124; and generate the second set of metrics for the second signal in Block S126.

Figure 7:
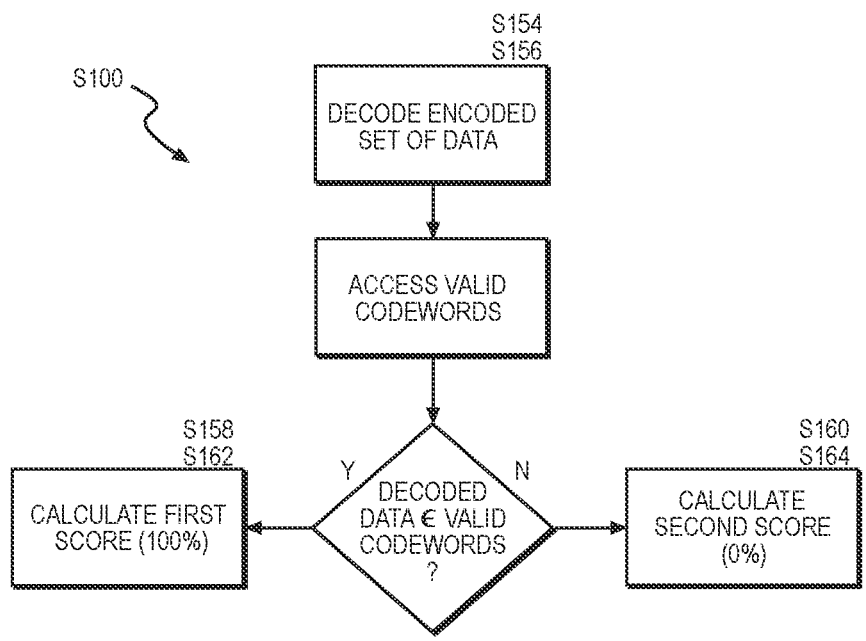
FIG. 7 is a flowchart representation of one variation of the method.

More specifically, as shown in FIG. 7, in Block S154, the first controller of the receiver module can: decode the first set of data encoded according to the first encoding scheme; and detect a match between the first set of data encoded according to the first encoding scheme and a valid codeword in the first encoding scheme (or detect a mismatch between the first set of data according to the first encoding scheme and a valid codeword in the first encoding scheme). Additionally, in Block S156, the second controller can: decode the first set of data encoded according to the second encoding scheme, the first set of data encoded according to the second encoding scheme exhibiting a minimum hamming distance (e.g., 4, 8, 16) from the first set of data encoded according to the first encoding scheme; and detect a match between the first set of data encoded according to the second encoding scheme and a valid codeword in the second encoding scheme (or detect a mismatch between the first set of data according to the second encoding scheme and a valid codeword in the second encoding scheme).

In Block S158, the first controller can calculate a first trust score (e.g., 100%) in response to detecting a match between the first set of data encoded according to the first encoding scheme and a valid codeword in the first encoding scheme. However, in Block S160, the first controller can calculate a second trust score (e.g., 0%, 25%, 50%) in response to detecting a mismatch between the first set of data encoded according to the first encoding scheme and a valid codeword in the first encoding scheme, the second trust score falling below the first trust score.

Similarly, the second controller can calculate a first trust score (e.g., 100%) in response to detecting a match between the first set of data encoded according to the second encoding scheme and a valid codeword in the second encoding scheme in Block S162. However, in Block S164, the second controller can calculate a second trust score (e.g., 0%, 25%, 50%) in response to detecting a mismatch between the first set of data encoded according to the second encoding scheme and a valid codeword in the second encoding scheme, the second trust score falling below the first trust score 9.1.10 System Trust Validation & Scoring Blocks of the method S100 recite, wherein receiving the first message includes receiving the first message further comprising a set of encoded data representing a state of the second communication module; and wherein calculating a first set of trust scores for the first message includes calculating a first score in the first set of trust scores based on the set of encoded data.

Blocks of the method S100 further recite, at the first controller, detecting a set of states for a set of subsystems in the first controller in Block S166; and wherein calculating a first set of trust scores for the first message includes calculating a first score in the first set of trust scores based on the set of states.

In one implementation, the receiver module can execute similar methods and techniques to: generate a metric (or a subset of metrics) for a system health process on a message in Block S122; and calculate a trust score (e.g., system health trust score, transmitter health trust score, receiver health trust score) for the message based on the metric and the configuration profile in Block S128. More specifically, the first controller can generate a first subset of metrics for a system health validation process in Block S124 and calculate a first system health trust score for the message based on the first subset of metrics in Block S130; and the second controller can generate a second subset of metrics for a system health validation process in Block S126 and calculate a second system health trust score for the message based on the second subset of metrics in Block S132.

For example, the receiver module can generate a subset of metrics based on: a state of a transmitter module (e.g., an overall state of the transmitter module, an overall state of a controller within the transmitter module, a state of a subsystem within a controller of the transmitter module) from which a message is transmitted; a state of the receiver module (e.g., an overall state of the receiver module, an overall state of a controller within the receiver module, a state of a subsystem within a controller of the receiver module); and/or a state of the communication network.

In one implementation, the receiver module can receive the first message further including a set of encoded data representing a state of the transmitter module in Block S114. The first controller can calculate a first score in the first set of trust scores based on the set of encoded data in Block S130. For example, the receiver module can calculate a first trust score (e.g., 100%) in response to detecting the set of encoded data representing a functional state of the transmitter module. However, the receiver module can calculate a second trust score (e.g., 0%, 25%, 50%) in response to detecting the set of encoded data representing a fault state of the transmitter module. Similarly, the second controller can calculate a second score in the second set of trust scores based on the set of encoded data in Block S132.

In another implementation, the first controller in the receiver module can: detect a set of states for a set of subsystems in the first controller in Block S166; and calculate a first score in the first set of trust scores based on the set of states in Block S130. For example, the first controller can calculate a first trust score (e.g., 100%) in response to detecting the set of states representing functional states of each subsystem within the first controller. However, the first controller can calculate a second trust score (e.g., 0%, 25%, 50%) in response to detecting a state (or subset of states) in the set of states representing a fault state of a subsystem within the first controller. Similarly, the second controller in the receiver module can: detect a set of states for a set of subsystems in the second controller in Block S168; and calculate a second score in the second set of trust scores based on the set of states in Block S132.

9.2 Trust Score Container

Block S176 of the method S100 recites generating a first trust score container based on the first set of trust scores and the second set of trust scores.

Generally, the receiver module can generate a trust score container (e.g., vector, array) based on the calculated trust scores. More specifically, the first controller (e.g., first safety controller) in the receiver module can generate a first set of trust scores, the second controller (e.g., second safety controller) in the receiver module can generate a second set of trust scores, and the third controller (e.g., security processor) can generate the trust score container based on the first set of trust scores and the second set of trust scores. Alternatively, the first controller and/or the second controller can generate the trust score container.

In one implementation, in Block S176, the receiver module can generate a trust score container including the first set of trust score and the second set of trust scores. For example, the receiver module can generate a trust score container (e.g., array) including: a first authentication trust score and a second authentication trust score, a first decryption trust score and a second decryption trust score, a first periodicity trust score and a second periodicity trust score, a first latency trust score and a second latency trust score, a first data source trust score and a second data source trust score, a first network path trust score and a second network path trust score, a first data integrity trust score and a second data integrity trust score, a first encoding trust score and a second encoding trust score, and/or a first system health trust score and a second system health trust score.

9.2.1 Combining Redundant Scores

Blocks of the method S100 recite: wherein calculating the first set of trust scores includes calculating, for the first message, a first periodicity trust score, a first latency trust score, a first data source trust score, a first network path trust score, a first data integrity trust score, and a first encoding trust score; and wherein calculating the first set of trust scores includes calculating, for the first message, a second periodicity trust score, a second latency trust score, a second data source trust score, a second network path trust score, a second data integrity trust score, and a second encoding trust score. Blocks of the method S100 further recite wherein generating the first trust score container includes generating the first trust score container includes: a composite periodicity trust score based on the first periodicity trust score and the second periodicity trust score; a composite latency trust score based on the first latency trust score and the second latency trust score; a composite data source trust score based on the first data source trust score and the second data source trust score; a composite network path trust score based on the first network path trust score and the second network path trust score; a composite data integrity trust score based on the first data integrity trust score and the second data integrity trust score; and a composite encoding trust score based on the first encoding trust score and the second encoding trust score.

Blocks of the method S100 recite, wherein generating a first trust score container based on the first set of trust scores and the second set of trust scores includes generating a third trust score in the first trust score container representing the first trust score and the second trust score, the third trust score falling below the first trust score.

Generally, the receiver module can: generate pairs of trust scores for each validation process; combine each pair of trust scores into a composite trust score for the validation process.

In one implementation, the receiver module can: generate a composite authenticity trust score based on the first authenticity score and the second authenticity score; generate a composite decryption trust score based on the first decryption score and the second decryption score; generate a composite periodicity trust score based on the first periodicity trust score and the second periodicity trust score; generate a composite latency trust score based on the first latency trust score and the second latency trust score; generate a composite data source trust score based on the first data source trust score and the second data source trust score; generate a composite network path trust score based on the first network path trust score and the second network path trust score; generate a composite data integrity trust score based on the first data integrity trust score and the second data integrity trust score; generate a composite encoding trust score based on the first encoding trust score and the second encoding trust score; and/or generate a composite system health trust score based on the first system health trust score and the second system health trust score.

In another implementation, the receiver module can generate a composite trust score for a validation process based on a match between a first trust score for the validation process and a second trust score for the validation process. For example, in response to detecting a match between a first authenticity trust score and a second authenticity trust score (e.g., exhibiting an identical trust score of 100%), the receiver module can generate a composite authenticity trust score characterized by the first authenticity trust score (or the second authenticity trust score).

In another implementation, the receiver module can generate a composite trust score for a validation process based on a mismatch between a first trust score for the validation process and second trust score for the validation process. For example, in response to detecting a mismatch between a first encoding trust score (e.g., 100%) and a second authenticity trust score (e.g., 50%), the receiver module can generate a composite encoding trust score characterized by a minimum (e.g., 50%) of first encoding trust score and the second encoding trust score. Alternatively, in response to detecting a mismatch between a first encoding trust score (e.g., 100%) and a second authenticity trust score (e.g., 50%), the receiver module can generate a composite encoding trust score characterized by a minimum trust score (e.g., 0%).

Accordingly, the receiver module can reconcile pairs of trust scores for redundant validation processes performed on redundant signals, thereby reducing a size of a trust score container and indicating a destination device of a validation and/or scoring error (e.g., a mismatch between a first trust score and a second trust score in a pair of trust scores for a validation process).

9.2.2 Composite Trust Score

Block S178 of the method S100 recites, calculating a first composite trust score representing the first set of trust scores and the second set of trust scores based on a formula defined in the first configuration profile, wherein generating the first trust score container includes generating the first trust score container including the first set of trust scores, the second set of trust scores, and the first composite trust score.

Generally, the receiver module can calculate a composite trust score for a message based on a configuration profile. More specifically, the receiver module can calculate a composite trust score representing a first set of trust scores and a second set of trust scores for a message based on a definition (e.g., formula) specified in a configuration profile.

In one implementation, the receiver module can: access a configuration profile defining a formula for a composite trust score based on a first subset of the first set of trust scores and a second subset of the second set of trust scores; and calculate the composite trust score based on the formula in Block S178.

For example, the receiver module can access a configuration profile defining the formula specifying: the first subset including a first authentication trust score, a first decryption trust score, a first data source trust score, a first network path trust score, a first data integrity trust score, a first encoding trust score, and a first system health trust score; and the second subset including a second authentication trust score, a second decryption trust score, a second data source trust score, a second network path trust score, a second data integrity trust score, a second encoding trust score, and a second system health trust score. The receiver module can then calculate the composite trust score based on these trust scores specified in the formula. More specifically, the receiver module can exclude the first periodicity trust score, the second periodicity trust score, the first latency trust score, and the second latency trust score when calculating the composite trust score based on the formula.

Accordingly, the receiver module can generate a composite trust score representing sets of trust scores for a message based on a configuration profile for a specific data stream, thereby enabling a destination device to utilize the composite trust score according to a specific set of requirements of the downstream device and/or the data stream.

9.2.2 Average Scores

Blocks of the method S100 recite, during a second time period succeeding the first time period, at the first communication module: receiving a third message from the second communication module in Block S114, the third message including a second set of data in the first data stream from the first device; calculating, at the first controller, a third set of trust scores for the third message based on the first configuration profile in Block S130; calculating, at the second controller, a fourth set of trust scores for the third message based on the first configuration profile in Block S132; and generating a second trust score container based on the third set of trust scores and the fourth set of trust scores in Block S176, the second trust score container including a first trust score based on an average of a set of metrics including a first metric for the first message and a second metric for the third message.

Generally, the receiver module can: store sets of metrics (e.g., first set of metrics, second set of metrics) for each received message; and calculate a trust score based on an average of these metrics for a set of messages within a window of a most recent time period (e.g., 5 minutes) or within a window of a predefined number of most recent messages (e.g., 10 messages).

In one implementation, the receiver module can: receive a second message from the transmitter module in Block S114; calculate, at the first controller, a third set of trust scores for the third message based on the first configuration profile in Block S130; calculate, at the second controller, a fourth set of trust scores for the third message based on the first configuration profile in Block S132; and generating a second trust score container based on the third set of trust scores and the fourth set of trust scores in Block S176. More specifically, the receiver module can calculate the second trust score container including a first trust score based on an average of a set of metrics including a first metric (e.g., latency of 10 milliseconds) for the first message and a second metric for the second message (e.g., latency of 30 milliseconds). In this implementation, in response to detecting the average of the set of metrics (e.g., 20 milliseconds), the receiver module can calculate a first trust score (e.g., 100%) in response to detecting the average metric (e.g., average latency) falling below a threshold (e.g., 50 milliseconds).

Accordingly, the receiver module can generate trust scores for an individual message and a set of messages representing a data stream, thereby enabling a destination device to detect and quantify trustworthiness of a data stream overall, based on requirements of the data stream, even when an individual message of the data stream fails to meet these requirements.

10. Data & Trust Score Transmission

Blocks of the method S100 recite: generating a second message including the first set of data and the first trust score container in Block S180; and transmitting the second message to a second device in Block S182.

Generally, in response to generating the set(s) of trust scores and/or the trust score container for a message, the receiver module can: generate a new message including the set of data and these trust scores; and transmit the new message to the destination device. More specifically, the third controller in the receiver module can generate and transmit the new message to the destination device.

In one implementation, in Block S180, the receiver module (e.g., the third controller within the receiver module) can generate the second message by fusing the first set of trust scores, the second set of trust scores, and/or the first trust score container with the first message including the first set of data. The receiver module can then transmit the second message to the second device.

In another implementation, in Block S180, the receiver module can generate the second message including the first set of data (i.e., decoded in Blocks S154 and S156) and the first trust score container. Additionally, the receiver module can generate the second message including a set of redundant frames including the first set of data, a set of CRC values, and/or any other data.

Accordingly, the receiver module can fuse a set of data with a set of trust scores representing trustworthiness of the set of data across multiple domains (e.g., authentication, decryption, periodicity, latency, data source, network path, data integrity, encoding, system health), thereby enabling a destination device to detect that the set of data meets a set of requirements specific to the destination device (or fails to meet this set of requirements) based on the set of trust scores.

11. Control Actions

Blocks of the method S100 recite, wherein generating the second message includes, in response to detecting a first trust score in the first trust score container falling below a threshold defined by the first configuration profile, generating the second message including the first set of data, the first trust score container, and a signal representing a safe state for the second device.

Generally, the receiver module (e.g., third controller of the receiver module) can perform a control action (or a set of control actions) in response to detecting a trust score falling below a threshold defined by a configuration profile.

In one implementation, in Block S184, the receiver module can detect that the first trust score container exceeds a first threshold defined by the first configuration profile.

However, in another implementation, in Blocks S180 and S186, in response to detecting a first trust score (e.g., encoding trust score of 0%) in the first trust score container falling below a threshold defined by the first configuration profile (e.g., 80%), the receiver module can generate the second message including the first set of data, the first trust score container, and a signal representing a safe state for the second device. More specifically, the receiver module can generate the second message including the signal representing the safe state for the second device, the signal representing the safe state for the second device exhibiting a minimum hamming distance (e.g., 4, 8, 16) from a signal representing a functional state for the second device. The receiver module can transmit the second message—including the signal representing the safe state—to the second device, and the second device can perform a control action (e.g., cease operation) in response to detecting the signal representing the safe state.

Accordingly, the receiver module can autonomously perform safety operations (e.g., issuing a command to place the destination device in a safe state) on behalf of a destination device in response to detecting a trust score for a message (or for a data stream) falling below a threshold defined in a configuration profile for the data stream, thereby reducing an amount of time to respond to an error or fault in the data stream.

11.1 Control Actions: Operating Mode

Block S184 of the method S100 recites, during the first time period, detecting that the first trust score container exceeds a first threshold defined by the first configuration profile. Blocks of the method S100 further recite, during a second time period succeeding the first time period, at the first communication module: receiving a second message from the second communication module in Block S114, the second message including a second set of data in the first data stream; detecting a third operating mode of the first device from the first set of operating modes in Block S116; detecting the second operating mode of the second device in Block S118; accessing a second configuration profile, in the set of configuration profiles, for the first data stream based on the third operating mode of the first device and the second operating mode of the second device in Block S120; calculating, at the first controller, a third set of trust scores for the second message based on the second configuration profile in Block S130; calculating, at the second controller, a fourth set of trust scores for the second message based on the second configuration profile in Block S132; generating a second trust score container based on the third set of trust scores and the fourth set of trust scores in Block S176; and, in response to detecting the second trust score container falling below a second threshold defined by the second configuration file, the second threshold falling below the first threshold, generating a fourth message in Blocks S180 and S188, including the second set of data, the second first trust score container, and a signal commanding the second device to enter a fourth operating mode in the second set of operating modes; and transmitting the fourth message to a second device in Block S182.

Generally, the receiver module can issue a command to the destination device to enter a particular operating mode (e.g., a degraded operating mode) in response to detecting a trust score falling below a threshold defined by a configuration profile. More specifically, the receiver module can: detect operating modes of the source device and the destination device; access a configuration profile based on the detected operating modes, each configuration profile defining a threshold; calculating trust scores for the message based on the configuration profile; and issue the command in response to detecting a trust score falling below the threshold defined in the configuration profile.

In one implementation, in Block S184, during a first time period, the receiver module can detect that the first trust score container exceeds a first threshold defined by the first configuration profile.

During a second time period succeeding the first time period, the receiver module can: receive a second message from the transmitter module in Block S114; detect a third operating mode of the source device from the first set of operating modes in Block S116; detect the second operating mode (e.g., full operation) of the destination device in Block S118; access a second configuration profile, in the set of configuration profiles, for the first data stream based on the third operating mode of the first device and the second operating mode of the second device in Block S120; calculate, at the first controller of the receiver module, a third set of trust scores for the second message based on the second configuration profile in Block S130; calculate, at the second controller of the receiver module, a fourth set of trust scores for the second message based on the second configuration profile in Block S132; and generate a second trust score container based on the third set of trust scores and the fourth set of trust scores in Block S176. In response to detecting the second trust score container (e.g., a latency trust score of 0% in the second trust score container) falling below a second threshold (e.g., 20%) defined by the second configuration file, the second threshold falling below the first threshold (e.g., 50%), the receiver module can generate a fourth message—including the second set of data, the second first trust score container, and a signal commanding the destination device to enter a fourth operating mode (e.g., degraded operation) in the second set of operating modes—in Blocks S180 and S188. The receiver module can then transmit the fourth message to a second device in Block S182.

Accordingly, the receiver module can: generate trust scores for messages based on different configuration profiles according to various operating modes of source devices and destination devices; and issue a command for a device (e.g., source device, destination device) to change an operating mode in response to detecting these trust scores falling below different thresholds defined in the configuration profiles. Therefore, the receiver module can configure an operating mode of a source device and an operating mode of a destination device to match a capability and/or trustworthiness of a data stream generated by the source device with the requirements of the destination device.

12. Multiple Source Data Streams

Blocks of the method S100 recite, during a second time period succeeding the first time period, at the first communication module: receiving a third message from a third communication module in Block S190, the third message including a second set of data in a second data stream from a third device; accessing a second configuration profile, in the set of configuration profiles, for the second data stream in Block S120; calculating, at the first controller, a third set of trust scores for the third message based on the second configuration profile in Block S130; calculating, at the second controller, a fourth set of trust scores for the third message based on the second configuration profile in Block S132; generating a second trust score container based on the third set of trust scores and the fourth set of trust scores in Block S176; generating a fourth message including the second set of data and the second trust score container in Block S180; and transmitting the fourth message to the second device in Block S182.

Generally, the receiver module can execute analogous (e.g., similar, identical) methods and techniques as described above to: receive a message—including a set of data in a second data stream from a second source device—from a second transmitter module communicatively coupled to the second source device; access a configuration profile for the second data stream; generate trust scores and/or a trust score container for the message; and transmit a new message including this set of data and the trust score container to the destination device.

12. Conclusion

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method comprising, during a first time period, at a first communication module comprising a first controller and a second controller:
    receiving a first message from a second communication module, the first message comprising:
        a first signal comprising a first set of data, in a first data stream from a first device, encoded according to a first encoding scheme; and
        a second signal comprising the first set of data encoded according to a second encoding scheme;
    accessing a first configuration profile, in a set of configuration profiles, for the first data stream;
    at the first controller:
        generating a first set of metrics for the first signal; and
        calculating a first set of trust scores for the first message based on the first set of metrics and the first configuration profile;
    at the second controller:
        generating a second set of metrics for the second signal; and
        calculating a second set of trust scores for the first message based on the second set of metrics and the first configuration profile;
    generating a first trust score container based on the first set of trust scores and the second set of trust scores;
    generating a second message comprising the first set of data and the first trust score container; and
    transmitting the second message to a second device.

2. The method of claim 1, further comprising, during a second time period succeeding the first time period, at the first communication module:
    receiving a third message from a third communication module, the third message comprising a second set of data in a second data stream from a third device;
    accessing a second configuration profile, in the set of configuration profiles, for the second data stream;
    calculating, at the first controller, a third set of trust scores for the third message based on the second configuration profile;
    calculating, at the second controller, a fourth set of trust scores for the third message based on the second configuration profile;
    generating a second trust score container based on the third set of trust scores and the fourth set of trust scores;
    generating a fourth message comprising the second set of data and the second trust score container; and
    transmitting the fourth message to the second device.

3. The method of claim 1:
    wherein calculating the first set of trust scores for the first message comprises calculating a first trust score in the first set of trust scores in response to detecting a match between the first set of data encoded according to the first encoding scheme and a valid codeword in the first encoding scheme; and
    wherein calculating the second set of trust scores for the first message comprises calculating a second trust score in the second set of trust scores in response to detecting a mismatch between the first set of data encoded according to the second encoding scheme and a valid codeword in the second encoding scheme, the second trust score falling below the first trust score.

4. The method of claim 3, wherein generating a first trust score container based on the first set of trust scores and the second set of trust scores comprises generating a third trust score in the first trust score container representing the first trust score and the second trust score, the third trust score falling below the first trust score.

5. The method of claim 3, further comprising:
    at the first controller, decoding the first set of data encoded according to the first encoding scheme; and
    at the second controller, decoding the first set of data encoded according to the second encoding scheme, the first set of data encoded according to the second encoding scheme exhibiting a minimum hamming distance from the first set of data encoded according to the first encoding scheme.

* * * * *